(12) United States Patent
Ruiz et al.

(10) Patent No.: US 11,873,789 B2
(45) Date of Patent: Jan. 16, 2024

(54) METHOD FOR STARTING A TURBINE IN A PUMP MODE

(71) Applicant: GE Renewable Technologies, Grenoble (FR)

(72) Inventors: Sébastien Ruiz, Grenoble (FR); Lionel Martinez, Vaulnaveys-le-Bas (FR)

(73) Assignee: GE Renewable Technologies, Grenoble (FR)

( * ) Notice: Subject to any disclaimer, the term of this patent is extended or adjusted under 35 U.S.C. 154(b) by 0 days.

(21) Appl. No.: 17/772,662

(22) PCT Filed: Oct. 29, 2020

(86) PCT No.: PCT/EP2020/080454
§ 371 (c)(1),
(2) Date: Apr. 28, 2022

(87) PCT Pub. No.: WO2021/084037
PCT Pub. Date: May 6, 2021

(65) Prior Publication Data
US 2022/0389897 A1    Dec. 8, 2022

(30) Foreign Application Priority Data

Oct. 29, 2019  (EP) .................................... 19306409

(51) Int. Cl.
*F03B 3/10*      (2006.01)
*F03B 15/00*     (2006.01)
*F03B 15/02*     (2006.01)

(52) U.S. Cl.
CPC .............. *F03B 3/10* (2013.01); *F03B 15/005* (2013.01); *F03B 15/02* (2013.01)

(58) Field of Classification Search
CPC ........... F03B 3/10; F03B 15/005; F03B 15/02
See application file for complete search history.

(56) References Cited

U.S. PATENT DOCUMENTS

| 3,309,057 A | 3/1967 | Tonooka |
| 4,708,594 A | 11/1987 | Shinmei et al. |

(Continued)

FOREIGN PATENT DOCUMENTS

| EP | 3379073 A1 | 9/2018 |
| JP | H0763154 A | 3/1995 |

OTHER PUBLICATIONS

European Search Report Corresponding to EP19306409 dated Feb. 10, 2020.

(Continued)

*Primary Examiner* — Brian O Peters
(74) *Attorney, Agent, or Firm* — Dority & Manning, P.A.

(57) ABSTRACT

The invention concerns a method for starting a hydroelectric turbine (10) in a pumping mode, said turbine being provided with a runner (6) mechanically coupled to a shaft line (8) and a variable speed electric motor connected to a grid, a distributor (4) comprising guide vanes to control a flow of water to said runner, the method comprising:
 a) a step of operating the variable speed motor at least partly at fixed speed, said guide vanes being only partially opened, and of defining or calculating:
  data of a plurality of hydraulic characteristics ($C_1$, $C_2$, $C_i$) of the turbine for an operation without cavitation;
  data of an operation range of the electric motor, giving the speed of the motor as a function of its power;
 b) then a step of operating the turbine in a power control mode.

12 Claims, 7 Drawing Sheets

(56) References Cited

U.S. PATENT DOCUMENTS

2005/0249594 A1* 11/2005 Chandraker .............. F03B 3/02
  416/115
2020/0040866 A1 2/2020 Alloin et al.

OTHER PUBLICATIONS

PCT International Search Report & Opinion Corresponding to PCT/EP2020/080454 dated Nov. 20, 2020.

* cited by examiner

METHOD FOR STARTING A TURBINE IN A PUMP MODE

TECHNICAL FIELD AND PRIOR ART

The invention relates to a method for starting a hydroelectric turbine in pump mode.

It is applicable to reversible pump-turbines or non-reversible pumps (for example in the case of a ternary group).

In particular, the invention relates to a method for starting the pump mode of a hydraulic turbine which comprises a generator whose rotor can be driven in rotation by a turbine and can be connected to a grid.

Such turbines can be operated in a production mode in order to produce electrical energy from hydraulic energy. In another mode, a so-called pump mode, they can be operated to pump water in order to absorb electrical energy, for example when it is produced in excess in the grid: the generator is powered by electrical energy provided by the grid to convert the electrical energy into mechanical energy for pumping water up in an upstream reservoir.

Some turbines are variable speed turbines, which means that the electrical motor does not operate at fixed speed (the speed is not imposed by the grid frequency).

Optimization of the working of this kind of turbine is difficult because many criterions must be met in order not to spend too much time in non-optimal mode, which means that the turbine is not optimally operated.

This is in particular the case if the grid is not stable, for example in terms of frequency or voltage.

It is therefore an object of the invention to propose a method for starting the pump mode of a hydroelectric turbine, in particular of the type having a variable speed motor, in a more optimal way, in particular in order to minimize the time spent in a non-optimal mode, than known prior art method.

It is also an object of the invention to propose a method for starting the pump mode of a hydroelectric unit, in particular of the type having a variable speed motor, connected to a grid which can have a variable or an unstable frequency and/or voltage, in particular when the hydraulic characteristics are such that starting in optimal mode is not possible.

SUMMARY OF THE INVENTION

The aforementioned objects are, at least partly, achieved by a method for starting a pump mode of a hydroelectric turbine provided with a runner mechanically coupled to a shaft line, a variable speed electrical motor, a distributor comprising guide vanes to control a flow of water to said runner, the method comprising:
a) a step of operating the variable speed motor at least partly at fixed speed, said guide vanes being only partially opened,
b) then a step of operating the turbine in a power control mode.

In a power control mode (during which power is being controlled, for example by an electrical controller), power varies with speed of the turbine, preferably with the best efficiency, the speed being imposed by the pump characteristics and/or speed variations being due to the pump characteristics.

Step a) can performed until the head reaches a minimum value to allow an operation of the turbine in a hydraulic optimal working mode, in particular without cavitation in the turbine, for example on the runner blades.

During said step a), the pump is operated in a hydraulic non-optimal mode: the guide vanes can be opened at a non-optimal operation opening.

Step b) is performed in a hydraulic optimal working mode, without cavitation on any side of blades of the turbine.

A method according to the invention allows starting a pump mode independently of the conditions on the grid or of the pressure (head): if the conditions to operate the turbine in an optimal mode are not met, it is operated in a non-optimal mode.

A method according to the invention minimizes the operation time spent in a non-optimal working mode of the pump: during said method, a verification can be performed, preferably regularly or constantly, to check whether there is a solution meeting both the hydraulic and electrical constraints. As soon as such a solution is found, the turbine can be operated in optimal mode, otherwise it is operated in non-optimal mode, with a speed set-point which can be calculated to correspond to the transition between non-optimal and optimal operation mode.

A method according to the invention may also present the advantage of improving the flexibility of the turbine cycle and design: it enables an enlarged operation range at low head for a pump turbine (providing added margin for the design). It also improves specific operation such as a first filling that are managed in a standard basis.

A method according to the invention can further comprise defining or calculating, before or during said step a), at least one of the following data:
data of a plurality of hydraulic characteristics ($C_1$, $C_2$, $C_i$) of the turbine for an operation without cavitation;
and/or data of an operation range of the electric motor, giving the speed of the motor as a function of its power.

The invention also concerns a method of programming control means, for example a controller or a computer, of a hydroelectric turbine provided with a runner mechanically coupled to a shaft line and with a variable speed electrical motor, comprising a distributor comprising guide vanes to control a flow of water to said runner, said method of programming comprising defining or calculating at least one of the following data:
data of a plurality of hydraulic characteristics ($C_1$, $C_2$, $C_i$) of the turbine for an operation of said turbine without cavitation;
and/or data of an operation range of the electric motor, giving the speed of the motor as a function of its power.

Said method of programming control means of said turbine can also comprise defining or calculating at least one set of data related to the opening of the guide vanes of said turbine.

In a method according to the invention, the fixed speed of step a) can be defined as the speed at which a hydraulic characteristic ($C_1$, $C_2$, $C_i$) has an intersection with the operation range of the electric motor, and/or the speed at which data of one of said hydraulic characteristic ($C_1$, $C_2$, $C_i$) is equal to, or close to, data of said operation range of the electric motor, preferably for the lowest possible head.

The invention also concerns an alternative method for starting a hydroelectric turbine in a pumping mode, said turbine being provided with a runner mechanically coupled to a shaft line and a variable speed electric motor connected to a grid, a distributor comprising guide vanes to control a flow of water to said runner; said alternative method comprises:

a) a step of operating the variable speed motor at least partly at fixed speed, said guide vanes being only partially opened, and of defining or calculating:
   data of a plurality of hydraulic characteristics ($C_1$, $C_2$, $C_i$) of the turbine for an operation without cavitation; and/or data of an operation range of the electric motor, giving the speed of the motor as a function of its power;
b) then a step of operating the turbine in a power control mode.

In one aspect of the invention or of the above alternative, the minimal head is found or calculated or estimated, for which both hydraulic and electric constraints are met.

Alternatively, the fixed speed of step a) can be the lowest speed of the operation range of the electric motor. In this case, step a) can comprise, after operating the variable speed motor at fixed speed, varying the speed of the motor and the power absorbed by the motor according to, or along, the low speed side of the operation range of the electric motor.

Step b) can comprise operating the turbine according to one of said hydraulic characteristics ($C_1$, $C_2$, $C_i$) of the turbine, or according to data of one of said hydraulic characteristics.

In a method according to the invention or according to the above alternative, step a) can have a duration of at least one minute or at least 10 min or at least one hour. A method according to the invention can also comprise at least one previous step of rotating the turbine and/or of increasing the power of the electric motor out of water.

Preferably, steps a) and b), can be performed under the control of control means, for example a computer which can be programmed for implementing said steps or a method according to the invention, memorizing speed and/or power (in particular absorbed power) data and/or opening data of the guide vanes.

The invention can be implemented in combination with a grid having a variable frequency.

The invention also concerns a hydroelectric turbine provided with a runner mechanically coupled to a shaft line and variable speed electrical motor, comprising a distributor comprising guide vanes to control a flow of water to said runner, further comprising means configured to control said hydraulic turbine so as to implement a method according to the invention or its alternative as disclosed above and in this application.

Said turbine can be a reversible pump-turbine or a non-reversible pump (for example it can belong to a ternary group).

Said turbine can be connected to a grid having a stable frequency or a frequency which is not stable (which depends on the location and presence of events on the grid).

The invention also concerns a computer program comprising instructions for implementing a method according to the invention or its alternative as disclosed above and in this application.

BRIEF DESCRIPTION OF THE DRAWINGS

Other characteristics and advantages shall appear in the following description of embodiments of the method for starting a hydroelectric turbine according to the invention, given by way of non-limiting examples, in reference to the annexed drawings wherein.

DETAILED DESCRIPTION OF SPECIFIC EMBODIMENTS

Figure 1:
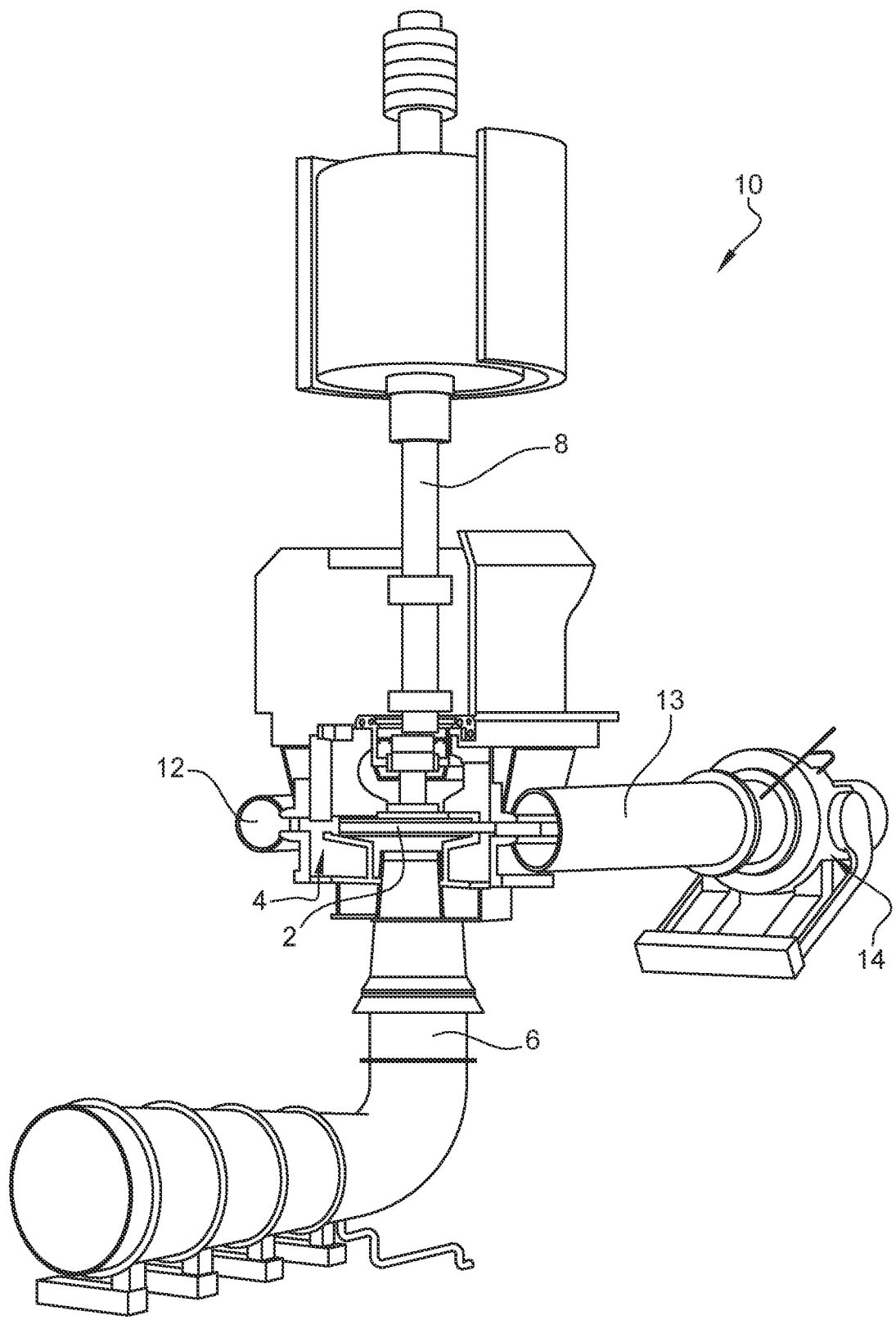
FIG. 1 is a schematic representation of a hydroelectric unit to which the invention can be applied.

An example of a hydroelectric turbine 10 to which the invention can be applied is illustrated on FIG. 1. Said turbine can be implemented in a hydroelectric power plant, with two water reservoirs, one reservoir upstream and one reservoir downstream.

Turbine 10 comprises a runner 2, a distributor 4 (which comprises guide vanes), a draft tube 6 and a shaft line 8. A spiral case 12 guides a flow of water from a duct 13 connected to a main inlet valve 14 and to the distributor, downstream of a penstock.

Via the shaft line 8 the runner 2 is mechanically coupled to the rotor of an electric motor (not illustrated on FIG. 1); when rotating, the runner drives the rotor into rotation inside the stator windings of said motor. The stator windings are themselves intended to be connected to a grid via a circuit breaker and a transformer. The frequency of the grid can be stable, but in certain circumstances it can be variable, for example between 50 Hz and 51 Hz. The invention can therefore be implemented to turbines in countries where the nominal frequency is 50 Hz, but also in countries where the nominal frequency is different from 50 Hz, for example 60 Hz.

The electric motor is a variable speed motor (or an asynchronous motor), not a synchronous type motor. Its speed can for example vary in a range of ±10% (other values possible, for example +/−15%, +/−20%, or even more, up to ±100%) of a given synchronous speed S. Its speed can thus vary between 2 values $S_1$ and $S_2$, $S_1$ being the minimum operation speed and $S_2$ being the maximum operation speed of the electrical machine. It has operation limits, or an operation characteristic, given by a curve as illustrated on FIG. 2A (which has approximately a "U" shape): it can operate in the shaded area 21, within these limits, which depend on the operation conditions of the grid (its frequency and/or its voltage, etc). In case the frequency of the grid is unstable or varies, the electrical limits of the electric motor also vary. Said electrical operation limits are given in terms of speed deviation of the unit shaft (in +/−%) from the synchronous speed of the electric motor magnetic field. Electrical limit can be provided under the form of speed slip (from the synchronous speed) expressed in percentage, and this speed slip depends on the power output (see FIG. 2A). For instance, for a synchronous speed=500 rpm and a power of 0 MW, the speed slip is −50 rpm/+50 rpm; at 200 MW, the speed slip is −10 rpm/+50 rpm.

The synchronous speed (SyncSpeed) is the speed of the rotor that would correspond to the grid frequency of a synchronous machine. It can be calculated, for example by a controller or a computer system or by the means 16 described below, preferably permanently or regularly, based on a measurement of the grid frequency Freq (in Hz) and on the number Np of pairs of poles of the electrical machine:

SyncSpeed=Freq*60/Np.

When frequency Freq varies, the synchronous speed also varies, and the electrical operation limits $S_1$ and $S_2$ as well. For a given electric motor, the maximum available speed range is a given percentage around the synchronous speed, for example +/−10% of said synchronous speed (or +/−20%, or even more, up to ±100%).

Figure 2A:
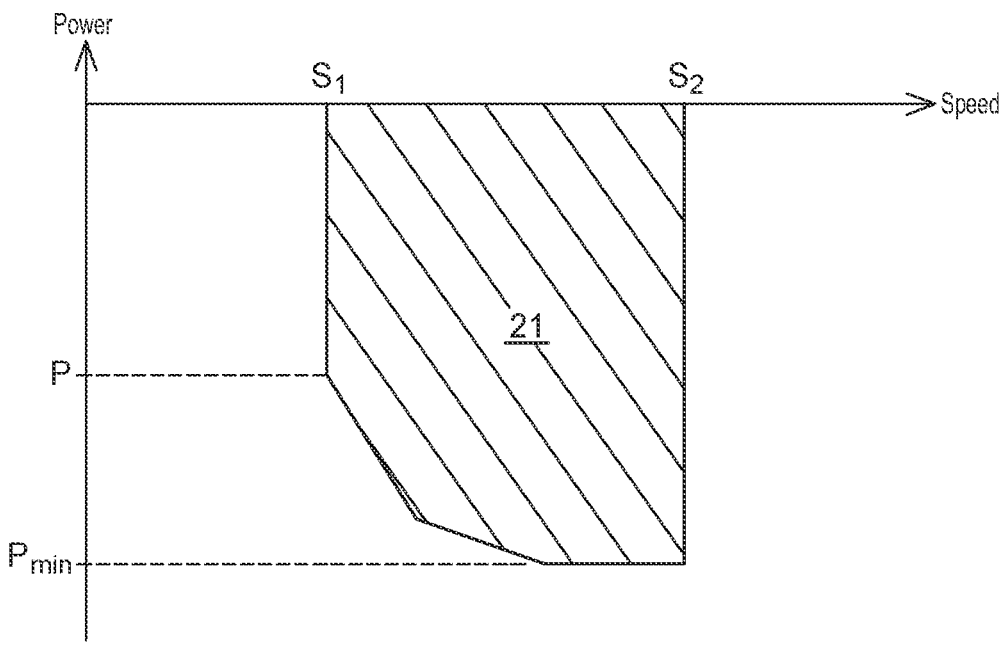
FIGS. 2A-2C are schematic power-speed diagrams representing the operational field of an electric motor with variable speed (FIGS. 2A, 2B) and a curve illustrating the reduced power versus the reduced speed of a turbine (FIG. 2C)
Figure 2B:
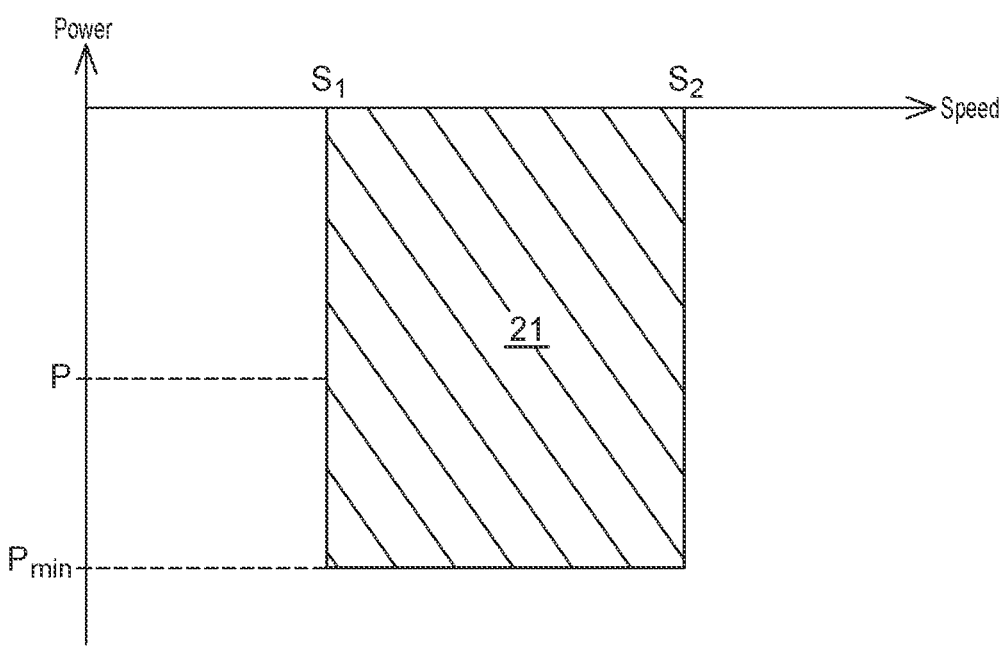

On FIGS. 2A and 2B, the lower limit $P_{min}$ is the maximum power which can be absorbed by the motor. The motor cannot work at a power lower than $P_{min}$. For any absorbed power between P (P>$P_{min}$) and 0, a broad (or maximum) range of motor speed is available; on FIG. 2A, for any power between P and $P_{min}$ the range of available motor speeds is narrower.

The area 21 may have different shapes, one example of another shape being illustrated on FIG. 2B, where the range of available motor speed remains broad and roughly constant between 0 and $P_{min}$. Furthermore, the turbine has hydraulic parameters which depend on the water head H and on the speed N of the turbine but which are expressed in terms of reduced speed n11, respectively reduced pressure p11, which are the rotation speed, respectively the reduced mechanical power, of a turbine of diameter 1 m operating under a head H of 1 m. n11 and p11 are defined as follows:

$$n11=N*D/(H)^{1/2} \quad (1)$$

$$p11=P/D^2/H^{3/2} \quad (2)$$

where N is the unit speed (in rpm), P is the mechanical power (in MW), D (expressed in m) is the turbine diameter (used for conversion between physical and reduced values), and H is the Head (difference of pressure between inlet and outlet of the turbine, in m-equivalent of water column, so-called net head). n11 and p11 can be calculated, for example by a controller or a computer system or by the means 16 described below, preferably permanently or regularly, based on measurements of H, N and P.

The above eq. (1) leads to $H=N^2*D^2/n11^2$ (1') and the above eq. (2) leads to $P=p11*D^2*H^{3/2}$ (2'), which gives, using (1'): $P=p11/n11^3*D^5*N^3$.

For a given turbine a curve or a 2D law (hydraulic characteristic, see the example of FIG. 2C, in optimal operation mode), which is dependent on the characteristics of the machine itself and on the head H, links the reduced pressure p11 and the reduced speed n11 for an optimal working (in terms of output). This 2D law, or data of said curve or 2D law, can be obtained by measurement on the physical machine by determining the most optimal points or data in term of efficiency, by varying the conditions of head, power and speed and gathering them under the form of p11(n11) and opening(n11) curbs.

This curve, or a corresponding set of data, extends between a first extreme point ($n11_{min}$, $p11_{min}$), under which cavitation effects occur, and a second extreme point ($n11_{max}$, $p11_{max}$) beyond which cavitation effects occur. In other words, for a given turbine and for a given reduced speed between $n11_{min}$ and $n11_{max}$, there is one reduced power for an operation without cavitation, which corresponds to a certain head H. Such a hydraulic characteristic, or data of said hydraulic characteristic, define(s) the operation points or the operation range of a given machine at which hydraulic operation is optimal (best or maximum hydraulic efficiency) for a given head H. Hydraulic efficiency can be defined as the ratio between hydraulic power (delivered by the turbine in pump mode) versus mechanical power (provided to the turbine in pump mode).

Connection between mechanical and electrical power is given by an estimation of the efficiency of the electrical part, which can be estimated or calculated by means of a 3D law, or a set of data corresponding to that law, or following that law, that gives the mechanical power estimate versus electrical power and turbine speed. Preferably, this efficiency of the electrical part is computed, for example permanently or regularly, by a controller or a computer system programmed for computing said efficiency, for example by the means 16 described below. This 3D law results from the representation of the electrical power versus the mechanical power at a given rotation speed. For instance, on FIG. 2D, 300 MW of mechanical power results in about 294 MW in electrical output power (latest point of the chart). The first point of the chart, −300 MW of mechanical power, needs about −305 MW of electrical power (consumption).

Figure 3:
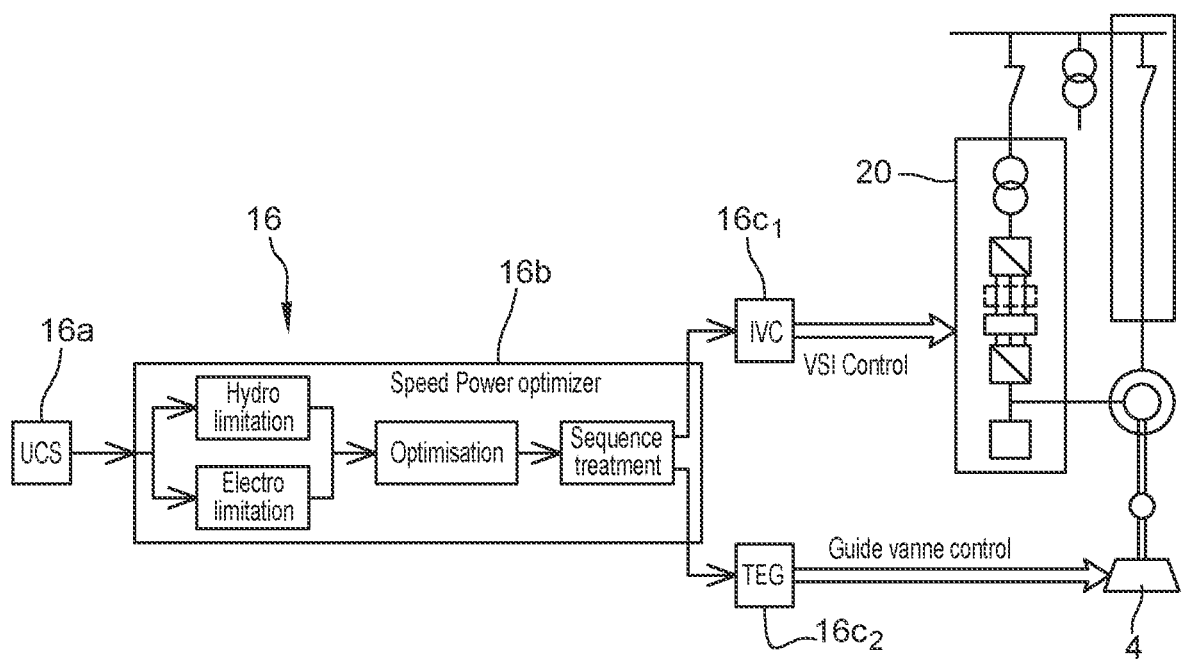
FIG. 3 is a schematic representation of control means of a hydroelectric unit, to control both the electric motor and the distributor of the turbine.

As illustrated on FIG. 3 both the distributor (in particular the opening of the guide vanes of the distributor) and the voltage-source inverter 20 (in particular its speed and/or power) can be controlled by control means or a control system 16, such as a controller or a computer system.

In an embodiment, these control means or this control system comprise(s):
- a first unit, or unit control system (UCS) 16a, in charge of the overall operation of the whole system, in particular the distributor and the motor 20;
- a second unit 16b (so called speed/power optimizer), which acts as the master for the control of a variable speed unit: based on the orders received from the control unit 16a, unit 16b generates the power and speed commands to both controllers $16c_1$ (so called inverter-voltage controller, or IVC) and $16c_2$ (so called turbine governor, or TEG) directly in charge of the process control:
  controller $16c_1$ is for controlling the electrical part (it adjusts the electrical torque, and thus the speed of the rotor and/or the electrical power), which, in turn, controls the voltage source inverter; indeed, electrical torque control can result in speed or power control depending on the control mode of the IVC. The second unit 16b decides what type of control the IVC shall perform (speed or power),
  turbine governor $16c_2$ controls the hydraulic part, in particular the opening or the closing of the guide vanes. Like for the IVC, the second unit 16b decides what type of control the TEG $16c_2$ shall perform (opening control in pump operation mode).

In power control mode, power is controlled by the electrical controller. Best efficiency is obtained by means of the opening of the vanes that is set according to the speed (see FIG. 7A—optimal operation part).

Sensors can be implemented to measure speed (for example by measuring the speed of the mechanical shaft (hydraulic turbine) to which the rotor is connected), frequency and voltage of the grid and these measurements are input to the system 16. The regulations are performed with control loops.

Head (or pressure difference) can also be measured; preferably, this measurement is as much as possible representative of the net head (i.e. difference between the very inlet and very outlet of the machine) and preferably integrates pressure difference, elevation difference and kinetic difference between inlet and outlet of the turbine.

Figure 2C:
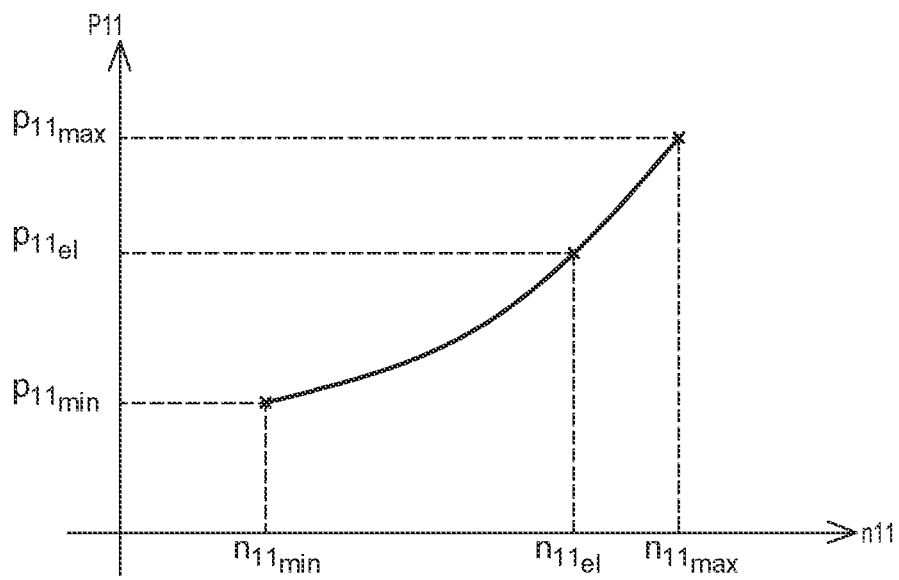
Figure 2D:
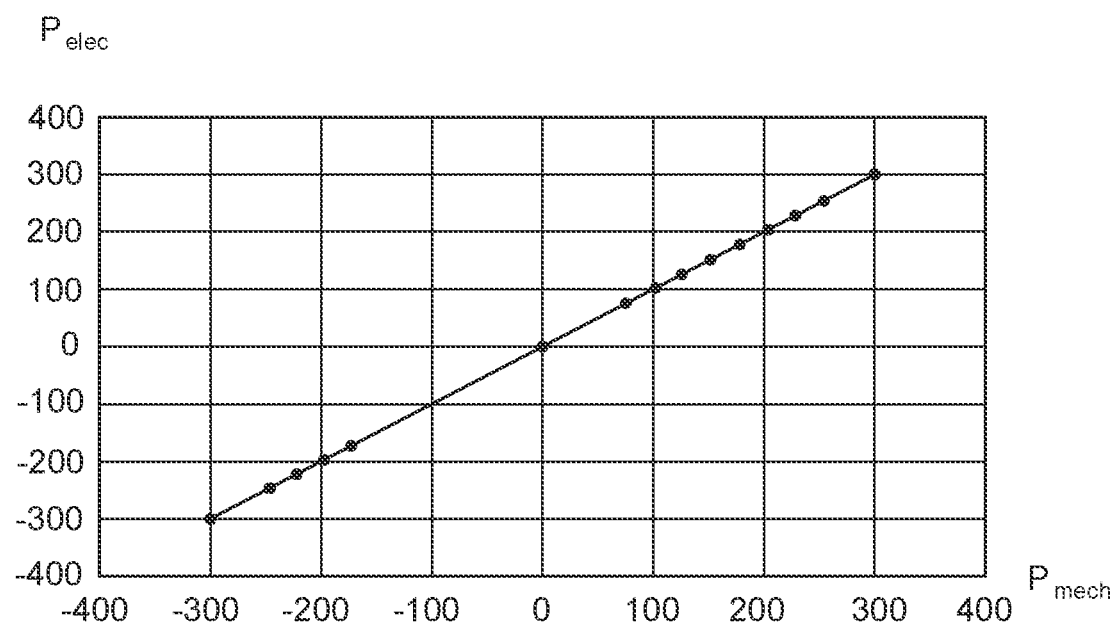
FIG. 2D represents the electrical power versus the mechanical power.
Figure 7A:
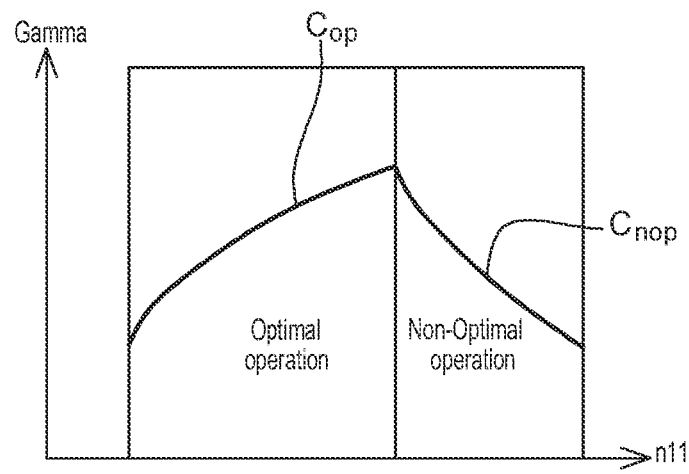
FIG. 7A is a diagram illustrating a law for opening the guide vanes.

Said control means also have one or more memory/memories to memorize data related to the electrical operation limits, or operation characteristic (for example: data representative of curves like the one of FIG. 2A or 2B) and data related to the reduced pressure as a function of the reduced speed (in other words data representatives of curves like the curve of FIG. 2C) and/or data related to the opening of the guide vanes (for example: data representative of curves like the one of FIG. 7A).

The control means 16 and/or each of the means $16c_1$, $16c_1$ can comprise one or more processor(s) comprising or memorizing instructions, or is programmed or configured, to implement a method according to the present invention, for example based on one or more set(s) of the previously mentioned memorized data.

The whole system can be used for producing electricity or for pumping water with help of the electric motor (controlled by the controller $16c_1$ in the embodiment of FIG. 3) operating the runner so as to pump water from the downstream side to the upstream side of the hydroelectric power plant (pump mode), which increases the water level upstream.

Figure 4:
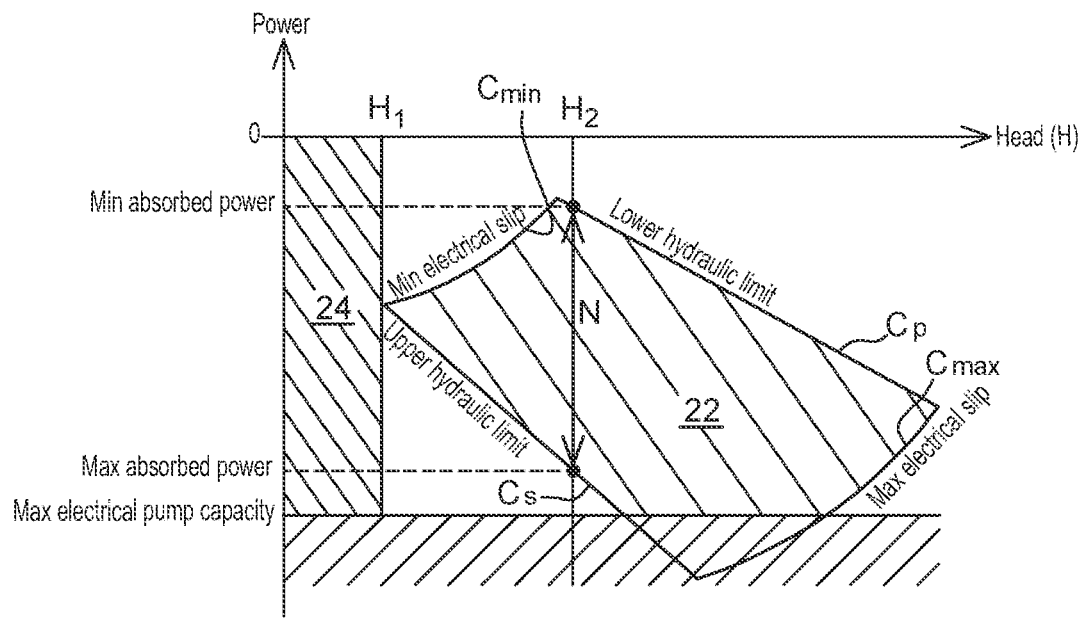
FIG. 4 is a power-head diagram representing the operational field of a hydroelectric turbine in a pumping mode.

FIG. 4 represents a (power, head) diagram of operation of a turbine in the pump mode. On this figure, the power is negative because power is absorbed in order to pump water from the downstream reservoir to the upstream reservoir (which explains why curve $C_p$ (resp. $C_s$) is called the "lower" (resp. "upper") hydraulic limit).

Preferably, the power and the pressure are adapted so that the turbine is operated in an optimal operation field 22. This field is limited by two hydraulic limits $C_p$, $C_s$ (which can for example correspond to cavitation limits, beyond which cavitation appears, either under the upper hydraulic limit (the cavitation suction side) or above the lower hydraulic limit (the cavitation pressure side) of each blade of the runner) and by two minimum and maximum electrical slips or curves $C_{min}$ and $C_{max}$, beyond which the electrical machine cannot be operated in term of speed slip allowance.

This field 22 has a lowest pressure ($H_1$), under which an optimal operation of the system in not possible. The control system 16, monitors, for example at regular intervals, electrical and hydraulic constraints for operating the turbine (in regard of current conditions) and thus can detect if there is a solution to operate or not in optimal operation.

For each head value H, the power values given by the cavitation pressure side $C_s$, resp. $C_p$ correspond to the power $p11_{min}$ of the lowest point ($n11_{min}$, $p11_{min}$) of the curve of FIG. 2C, resp. to the power $p11_{max}$ of the highest point ($n11_{max}$, $p11_{max}$) of the curve of FIG. 2C. For a current head value $H_2$, as illustrated on FIG. 4, there is therefore a power range, for which the operation of the pump remains optimum, without cavitation; a range of speed N can also be considered.

The minimum and maximum electrical slips or curves $C_{min}$ and $C_{max}$, are given by the electrical limits of the electrical motor.

On FIG. 2C, a limit ($n11_{el}$, $p11_{el}$) (see FIG. 2) lower than the theoretical highest point ($n11_{max}$, $p11_{max}$) can be imposed by the electric limit of the motor. On FIG. 4, it is either located on the minimum or maximum electrical slip boundary.

Every limit curve $C_s$, $C_p$, $C_{min}$ and $C_{max}$, or data of said curves or representing said curves, can be, preferably permanently or regularly, computed by the system 16, for example programmed for computing said curves or data representative of said curves, based on data that are provided, in particular on current measurements:

$C_s$, resp. $C_p$, can be calculated or estimated by the law which gives p11 versus n11; Current head $H_2$ is measured for example constantly or at regular intervals, and is used for conversion to mechanical power (in MW) and speed (in rpm); for current head $H_2$ the absorbed electrical power can vary between a maximum and a minimum in order to keep the system in the optimal operation field 22;

$C_{min}$ and $C_{max}$ can be calculated or estimated by the law that gives the speed slip (between rotor and stator) versus electrical power (see FIG. 2A or 2B). $C_{min}$, resp. $C_{max}$, corresponds to the minimum, resp. maximum, attainable speed due to electrical limits.

Efficiency estimation (as mentioned above) is also used to make the conversion between mechanical and electrical values. At low pressure (H<$H_1$), the system is operated in non-optimal conditions in the field 24. This field should be avoided because it does not correspond to the expected or required working conditions of a turbine in pump operation mode.

According to the invention, upon starting the system in a pump mode, the motor is first operated in said non optimal field 24 and then operates in said optimal operation field 22. In particular, said processor or computer 16 is configured or programmed so as to implement a first process step, wherein the motor is first operated in non-optimal conditions for the pump (hydraulic part; in field 24, see FIG. 4) and then a second process step, wherein the motor is operated in optimal conditions (in field 22, see FIG. 4).

In particular, said control means or controller or computer 16 can be configured or programmed so as to implement a process according to the invention, in particular in order:

a) to partially open the guide vanes so that the speed of the electric motor is controlled and kept at a fixed speed;
b) then to further open the guide vanes of the distributor, the turbine being preferably operated in a power control mode.

During step a), the speed of the electric motor can be controlled and kept at a fixed speed until, for example, the electrical power absorbed by the turbine is approximately equal to a power for a hydraulic optimal working mode or is approximately equal to a power of a power control mode or until the pressure difference is sufficient for the system to be operated in the optimal operation field 22.

Figure 5:
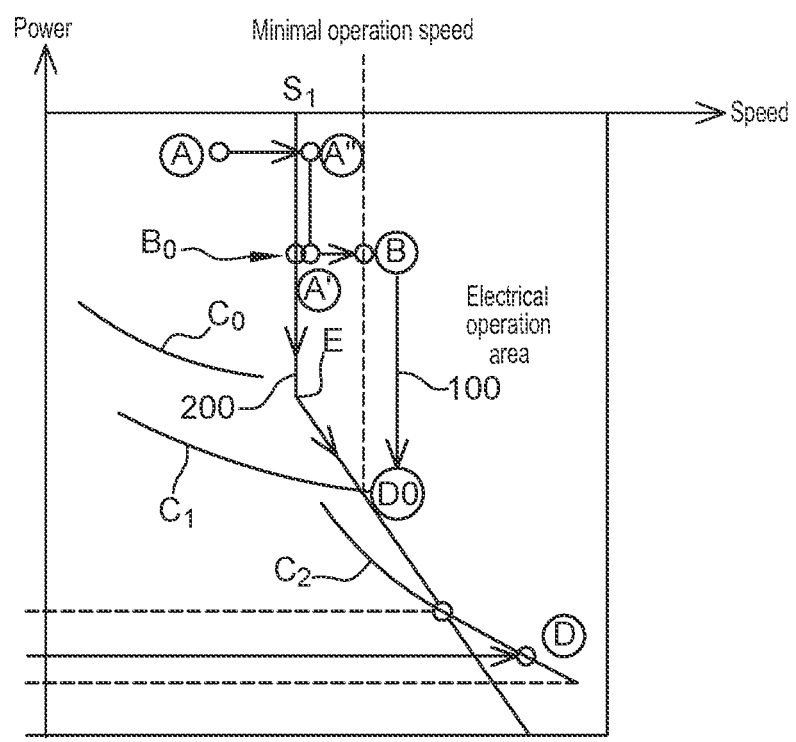
FIG. 5 is a power-speed diagram representing steps for starting a turbine in a pumping mode according to the invention.

FIG. 5 is a power-speed diagram, showing the variations of the power of the motor and of the speed of the turbine during an embodiment of a process according to the invention. Different states of the system, each defined by a power and a speed, are identified on this diagram by letters A, A", A', B, $D_0$ and D.

Each of curves $C_0$, $C_1$ and $C_2$, or its data, is a hydraulic characteristic and represents, for a given head H, $H_1$, $H_2$, ($H_2$>$H_1$), the variations of the speed N as a function of the power P absorbed by the turbine for an optimal operation of the turbine (maximum hydraulic efficiency).

Each hydraulic characteristic, or data of said hydraulic characteristic, defines a safe operation of the machine (without cavitation) and for maximal hydraulic efficiency. In an optimal operation mode the machine is not operated outside such a characteristic. Each hydraulic characteristic (like curves $C_0$, $C_1$, $C_2$ etc), or data of said hydraulic characteristic, can be defined by the 2 dimension law that provides the power P versus the speed N, as already explained above.

$C_0$ also corresponds to an optimal operation of the unit, but at a head which is too low to find a possibility to operate the machine within the electrical limits. $C_0$ can be calculated or computed by means of a 2D law (p11 versus n11) but the resulting computation will lead to speeds that are not attainable due to electrical limits.

On FIG. 5, curve $C_1$ is given for a head $H_1$ (higher than the head H corresponding to $C_0$) and curve $C_2$ is given for a higher head $H_2$, the corresponding heads and powers being in the optimal field 22 of FIG. 4; any of said hydraulic characteristic gives a power range for a given pressure, said pressure and each power of said range being located in field 22 (FIG. 4).

A set of such curves $C_i$ (i>1) representing such hydraulic characteristic, or data related to such curves, can be calculated and/or memorized by the control means 16. For example, the above mentioned 2 dimension law defines a function y=f(x) by means of a set of points (in x and y) that define straight sections (by means of linear interpolation between 2 consecutive points) and this set of points that can be memorized and/or calculated by the control means 16.

It has to be noted that mechanical power varies according to the opening of the guide vanes, thus affecting electrical power (that is represented on the graph). When electrical power is being controlled by the IVC, opening of the guide vanes affects absorbed mechanical power. There is an impact on the speed but electrical power is not affected since it is controlled by the IVC. Besides, the limits can be computed, for example constantly or at regular intervals, since they vary according to the head, and/or the frequency, and/or the voltage, etc.

According to an embodiment of the invention, starting from state B on FIG. 5, the speed is controlled and kept constant (step a) at a value at which a hydraulic characteristic $C_1$ has its extreme point (on its high speed side) which meets the electrical limit (on its low speed side). During this step, if the frequency of the grid varies, the speed is varied correspondingly (electrical speed limits vary according to the grid frequency variation). The head $H_1$ corresponding to this hydraulic characteristic $C_1$ (and to the corresponding state $D_0$, see FIG. 5) is the minimal operation head. The state of the system follows a path 100 from B to $D_0$, $D_0$ being both on the high speed part of $C_1$ and on the electrical limit. In other words, the electric motor first pumps water until the water level upstream or the water difference reaches at least a minimum value (and the head reaches a corresponding minimum value too (equal to head $H_1$ of FIG. 4), approximately identified by state $D_0$ on FIG. 5 and corresponding to an optimal power-speed curve. This first step has a duration which can be comprised between at least one minute, or some minutes (for example 10 minutes) and one or several hours (for example 2 or 3 hours).

Alternatively, it is possible to start from the minimum operation speed $S_1$ given by the lowest electrical limit until the speed and power are those of state $D_0$. The state of the system first follows a path 200 (see FIG. 5, starting at state $B_0$) along said lowest electrical limit until curve $C_1$ is reached: the first step follows the electrical limit, first at fixed speed until bend E and then from bend E, until curve $C_1$. Then, in a second step (step b), starting from state $D_0$, or from curve $C_1$ (path 2), the guide vanes can be further opened, according to the law that gives the opening of the guide vanes versus n11 in the optimal operation mode. Thus speed can be increased, together with the power, in an optimum way, the speed and the power varying along one of the optimal curves $C_1$ (during this second step the turbine is operated in a power control mode). Once point $D_0$ has been reached, operation can be performed in optimal mode (maximum efficiency). From $D_0$, operation is in power control mode, absorbed power being controlled by the IVC and pump being operated in zone 22 (see FIG. 4).

As pressure increases (because more water is pumped), the optimal curve $C_1$ can vary and other states of the system, like state D (FIG. 5), can be reached. From state B to state $D_0$ only the speed is controlled. Starting from state $D_0$ the power of the turbine can be optimally controlled, the system further pumping water from the downstream reservoir to the upstream reservoir.

During step a (for example from state B to state $D_0$), the speed is kept at a low value by a limited opening of the guide vanes, for example as explained below in connection with FIG. 7A. Speed is controlled by means 16c1 (FIG. 3, electrical side controller). Opening in this non-optimal domain is controlled: cavitation issues are avoided but operation is performed with a low hydraulic efficiency, by means of the law that defines opening versus n11. It can be noted that the speed on FIG. 7A is in reduced value. In step a, speed might be kept constant but n11 varies according to the head variation. The opening is being set to low value according to the n11 value due the law of FIG. 7A.

Based on the hydraulic characteristic (like the curves $C_1$, $C_2$ etc) and the electrical limits of the electric motor, the minimal operation speed of the turbine (which is the speed that will be maintained during phase a, for example between B and $D_0$) can be evaluated or calculated; it is for example the speed at which the high speed side of one of the hydraulic characteristic intersects the electrical limit; in other words, it gives the solution for meeting both the hydraulic constraints (hydraulic characteristics) and for operating in the electrical operation area (inside the electrical limits) at the lowest possible head.

Figure 6A:
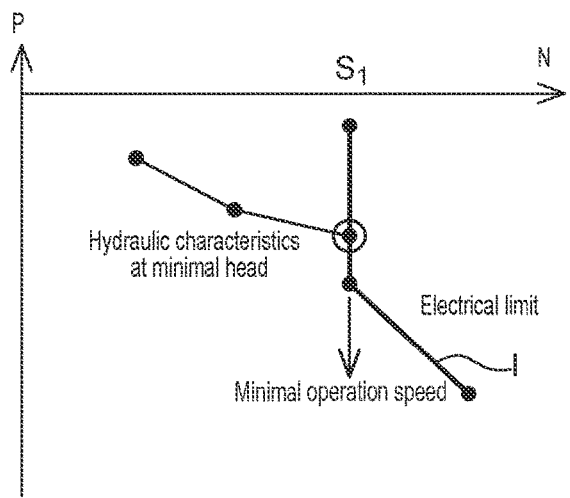
FIGS. 6A and 6B are power-speed diagrams illustrating how an embodiment of calculation of a minimal operation speed is performed.
Figure 6B:
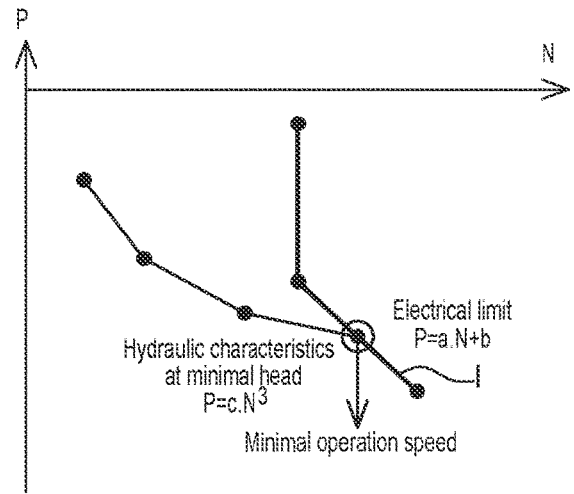

FIGS. 6A and 6B illustrate 2 cases in a power-speed diagram, in which part of the electrical limits of an electric motor is shown. As already explained, such limits are imposed by the grid (its frequency and/or its voltage, etc) and are due to the asynchronous character of the electric motor of the system. In case the frequency of the grid in unstable or varies, the electrical limits of the electric motor also vary.

On FIG. 6A, the high speed side, or data of said high speed side, of a hydraulic characteristic curve, for the lowest possible head, has an intersection with the vertical straight section I of the electrical limit, this intersection giving the minimal operation speed $(S_1)$. In other words, data of said high speed side of said hydraulic characteristic curve are equal or close to data of said vertical straight section I. On FIG. 6B, the high speed side of the hydraulic characteristic has an intersection with a non-vertical straight section of the electrical limit. This intersection gives the operation speed $S_{min}$ at which the turbine is operated to reach a state where both hydraulic and electric constraints are met (operation without cavitation and within the electrical limits). In this case, this operation speed corresponds to the speed of the point that fulfills the following equations:

$P = a \cdot N + b$, which corresponds to the straight section I of the electrical limit (P=power, N=speed, a and b are coefficient of the straight section; if this straight sections I extends between (N1,P1) and (N2,P2), a and b can be obtained by:

$$a = (P1-P2)/(N1-N2)$$

$$b = (P2*N1-P1*N2)/(N1-N2);$$

P1 and P2 are mechanical powers; they are converted from the electrical limit (electrical powers) to mechanical power by means of the efficiency estimate (between mechanical and electrical power);

$P=p11/n11^3 * D^5 * N^3$ p11, n11, D, H and N are defined above in this description.

In both cases (FIG. 6A, FIG. 6B), only one solution meets both hydraulic and electrical constraints (no cavitation and electrical operation area inside the electrical limits of FIG. 2A or 2B), for the lowest possible pressure (the operation speed thus found being therefore a "minimal" operation speed).

In case the above mentioned alternative is performed, no such calculation of the operation speed is performed, since the state of the system follows the electrical limit.

It has also to be noted that in both cases the minimal operation speed can vary since the electrical limits vary according to grid frequency and possibly according to other electrical conditions such as grid voltage. For this reason, the system 16 calculates, preferably constantly or regularly, the electrical limits and the intersection with the hydraulic characteristics. During the process, $D_0$ can vary and the speed from B to $D_0$ is adapted accordingly.

The opening of the guide vanes is controlled based on curves, or on data of said curves, like those of FIG. 7A which gives Gamma as a function of n11 (already mentioned above), both for an optimal operation (in field 22 of FIG. 4) ($C_0$) and a non-optimal operation ($C_{no}$).

Gamma versus n11 (in FIG. 7A) is determined from the pump characteristics that are provided for a turbine in pump operation mode in term of a set of operation points (opening, n11, p11, efficiency) that covers the whole operation area of the pump. From this set of operation points, the envelope curve is a selection of the optimal operation points at which the turbine can be best operated (best efficiency).

For optimal operation, when operation is possible between authorized cavitation limits, gamma vs n11 is determined for having turbine operation on the envelope curve.

Figure 7B:
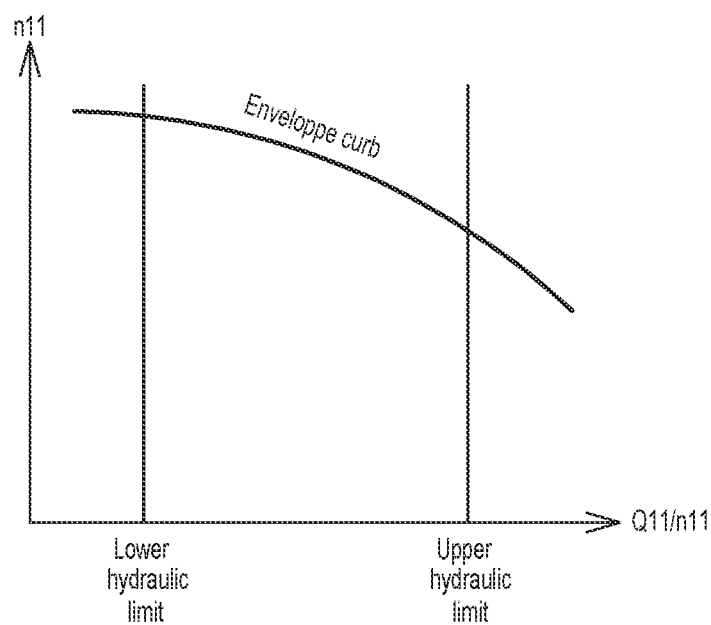
FIG. 7B is diagram illustrating a law giving n11 as a function of Q11/n11.

For non-optimal operation (when operation point cannot be performed on the envelope curve due to upper hydraulic limit in the plan Q11/n11 vs n11) gamma vs n11 is determined so that the turbine operates along the lower hydraulic limit in the plan n11 vs Q11/n11 (based on the data set of the characteristics of the pump), or according to data of said lower hydraulic limit, as illustrated on FIG. 7B.

Gamma gives the opening of the water inlet, given in percentage (0% for full closure to 100% for maximal attainable opening) or in degree corresponding to the angle of the guide vane.

During step b of a method according to the invention, the opening of the guide vanes follows curve $C_{op}$, which avoids any cavitation effect. During step a, the opening of the guide vanes follows curve $C_{nop}$. Such curves—or data related to them—can be memorized in a memory of the control means 16. The initial state B of step a) can be reached after:

a first speed increase from state A (at which the unit is synchronized to the grid, the speed in state A being the synchronization speed) to state A";

a first power increase from state A" to state A', watering of the unit being performed during this part of the process with the guide vanes still being closed;

and a second speed increase from state A' to state B. The guide vanes are still closed in state B, the turbine being watered; then, from B to $D_0$, they are opened.

In case the above mentioned alternative is performed, the initial state $B_0$ of step a) can be reached after:

a speed increase from state A (at which the unit is synchronized to the grid, the speed in state A being the synchronization speed) to speed $S_1$;

a power increase along the electrical limit, at constant speed $S_1$, watering of the unit being performed during this part of the process with the guide vanes still being closed.

Transition between stages A" and A' (watering) does not necessarily occur at speed $S_1$ (which is the minimum allowed speed by the electrical components). This watering speed can be a fixed speed (independent of head, frequency, etc). Preferably transition A"/A' always occurs at the same speed. When watering is finished, speed is first controlled (with the guide vanes fully closed) either at S1 (alternative of path 200) or to the speed corresponding to $D_0$ (path 100).

An advantage of the invention is to be able to cope with variable grid conditions, in particular with a variable grid frequency. If the grid frequency varies, the various parameters and functions, in particular the electrical limits (FIG. 2A) of the motor can be updated.

The invention claimed is:

1. A method for starting a hydroelectric turbine in a pumping mode, said turbine being provided with a runner mechanically coupled to a shaft line and a variable speed electric motor connected to a grid, a distributor comprising guide vanes to control a flow of water to said runner, the method comprising:
    a step (a) at start-up in the pumping mode of operating the variable speed motor at least partly at fixed speed in a non-optimal mode, said guide vanes being only partially opened during step (a);
    a step (b) subsequent to step (a) wherein the turbine is operated in an optimal power control mode;
    wherein before or during step (a), and of defining or calculating:
        data of a plurality of hydraulic characteristics of the turbine for an operation without cavitation;
        data of an operation range of the electric motor, giving the speed of the motor as a function of its power;
    wherein the fixed speed of step (a) is maintained until a hydraulic head on the turbine reaches a minimum value for operation of the turbine in the optimal power control mode.

2. The method according to claim 1, the fixed speed of step (a) is a speed at which the data of one of said hydraulic characteristics is equal to the data of said operation range of the electric motor.

3. The method according to claim 1, wherein the fixed speed of step (a) is a being the lowest speed of the operation range of the electric motor.

4. The method according to claim 3, wherein step (a) further comprises, after operating the variable speed motor at the fixed speed, varying the speed of the motor and the power absorbed by the motor according to a low speed side of the operation range of the electric motor.

5. The method according to claim 1, wherein step (b) comprises operating the turbine according to one of said hydraulic characteristics of the turbine in the optimal power control mode.

6. The method according to claim 1, wherein step (a) has a duration of at least one minute.

7. The method according to claim 1, wherein steps (a) and (b) are performed under the control of a computer having stored data for speed and power of the motor and opening data of the guide vanes.

8. The method according to claim 1, wherein the grid has an unstable frequency.

9. A hydroelectric turbine provided with a runner mechanically coupled to a shaft line and a variable speed electrical motor, said turbine further comprising a distributor comprising guide vanes to control a flow of water to said runner, said turbine further comprising a controller configured to start said hydroelectric turbine with the method according to claim 1.

10. The hydroelectric turbine according to claim 9, wherein said turbine is one of a pump-turbine, a Francis turbine, a Kaplan turbine, or a bulb turbine type.

11. The hydroelectric turbine according to claim 9, said turbine being connected to a grid having a variable frequency.

12. A computer program comprising instructions for implementing the method according to claim 1.

* * * * *